Oct. 12, 1954  F. J. McDEVITT  2,691,271
WASTE HEAT POWER PLANT, INCLUDING AIR TURBINE CYCLE
Filed April 20, 1950  4 Sheets-Sheet 1

INVENTOR
Frank J. McDevitt
BY
JP Moran
ATTORNEY

Oct. 12, 1954   F. J. McDEVITT   2,691,271
WASTE HEAT POWER PLANT, INCLUDING AIR TURBINE CYCLE
Filed April 20, 1950   4 Sheets-Sheet 2

INVENTOR
*Frank J. McDevitt*
BY
*J. P. Moran*
ATTORNEY

Oct. 12, 1954     F. J. McDEVITT     2,691,271
WASTE HEAT POWER PLANT, INCLUDING AIR TURBINE CYCLE
Filed April 20, 1950     4 Sheets-Sheet 3

INVENTOR
Frank J. McDevitt
BY
ATTORNEY

Oct. 12, 1954           F. J. McDEVITT           2,691,271

WASTE HEAT POWER PLANT, INCLUDING AIR TURBINE CYCLE

Filed April 20, 1950                                                  4 Sheets-Sheet 4

INVENTOR
Frank J. McDevitt
BY
ATTORNEY

Patented Oct. 12, 1954

2,691,271

UNITED STATES PATENT OFFICE 2,691,271

WASTE HEAT POWER PLANT, INCLUDING AIR TURBINE CYCLE

Frank J. McDevitt, St. Louis, Mo.

Application April 20, 1950, Serial No. 157,106

7 Claims. (Cl. 60—59)

My invention relates in general to improvements in gas turbine power plants and, more particularly, to power plants involving an air turbine which utilizes the heat developed by the burning of two or more types of fuels separately or simultaneously. My invention in its more specific aspects is especially designed and particularly adapted for the efficient burning of high moisture content municipal refuse, trash, etc. and utilization of the heat generated for the production of electric power and drying and burning of the fuel.

In a power plant constructed in accordance with my invention, the combustion of a primary solid fuel having a high moisture content, such as combustible municipal refuse which may have a moisture content as high as 60%, and a supplementary fluid fuel, such as gas or oil, are correlated to produce a continuous and substantially uniform stream of high temperature gaseous products of combustion which are utilized for the preheating to a high temperature of compressed air subsequently expanded through an air turbine for the generation of electric power, the high temperature exhaust air from the turbine being utilized for the rapid drying and burning of the primary solid fuel and burning of the supplementary fluid fuel. Provisions are also included in the plant for automatically protecting the air heater from overheating if the air supply thereto should be discontinued for any reason.

Figure 1:
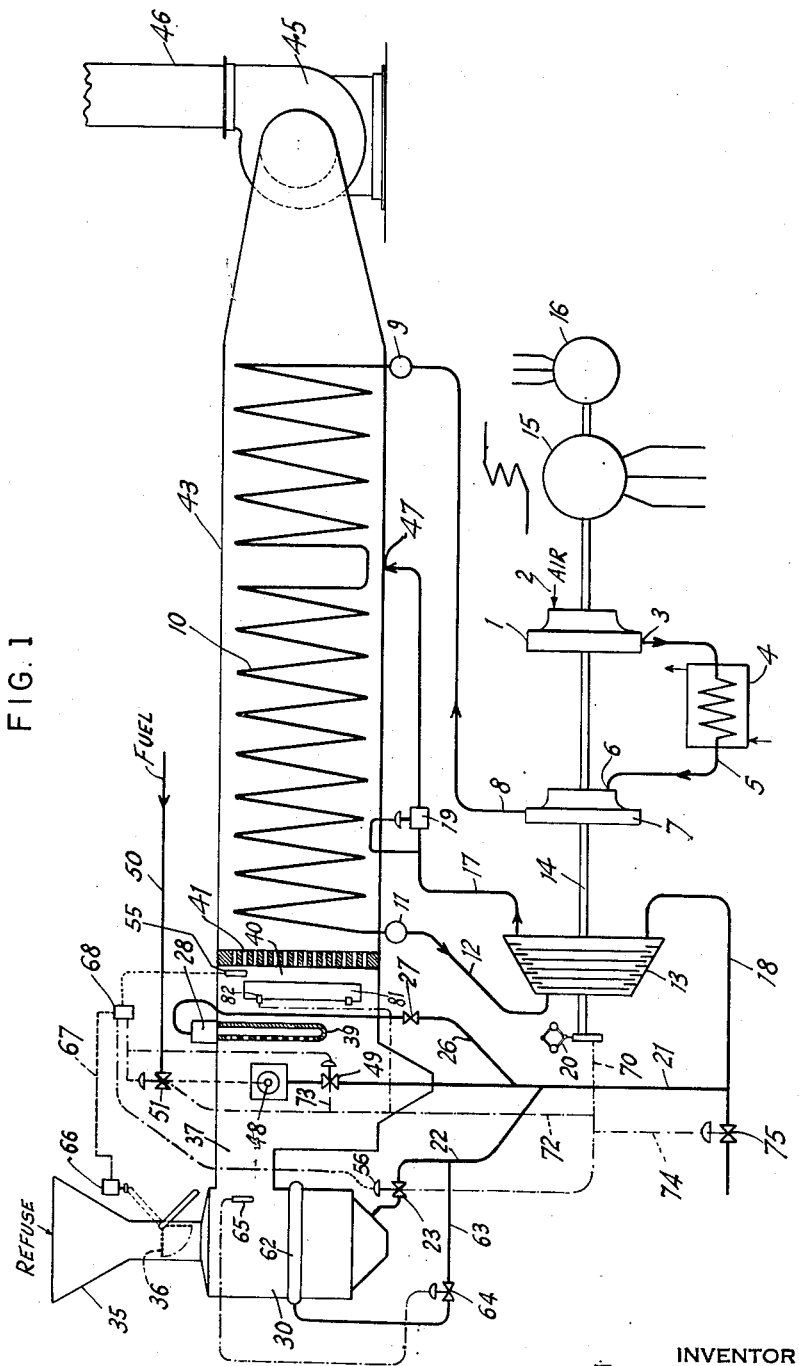
Fig. 1 is a diagrammatic illustration of a preferred embodiment of my invention.
Figure 2:
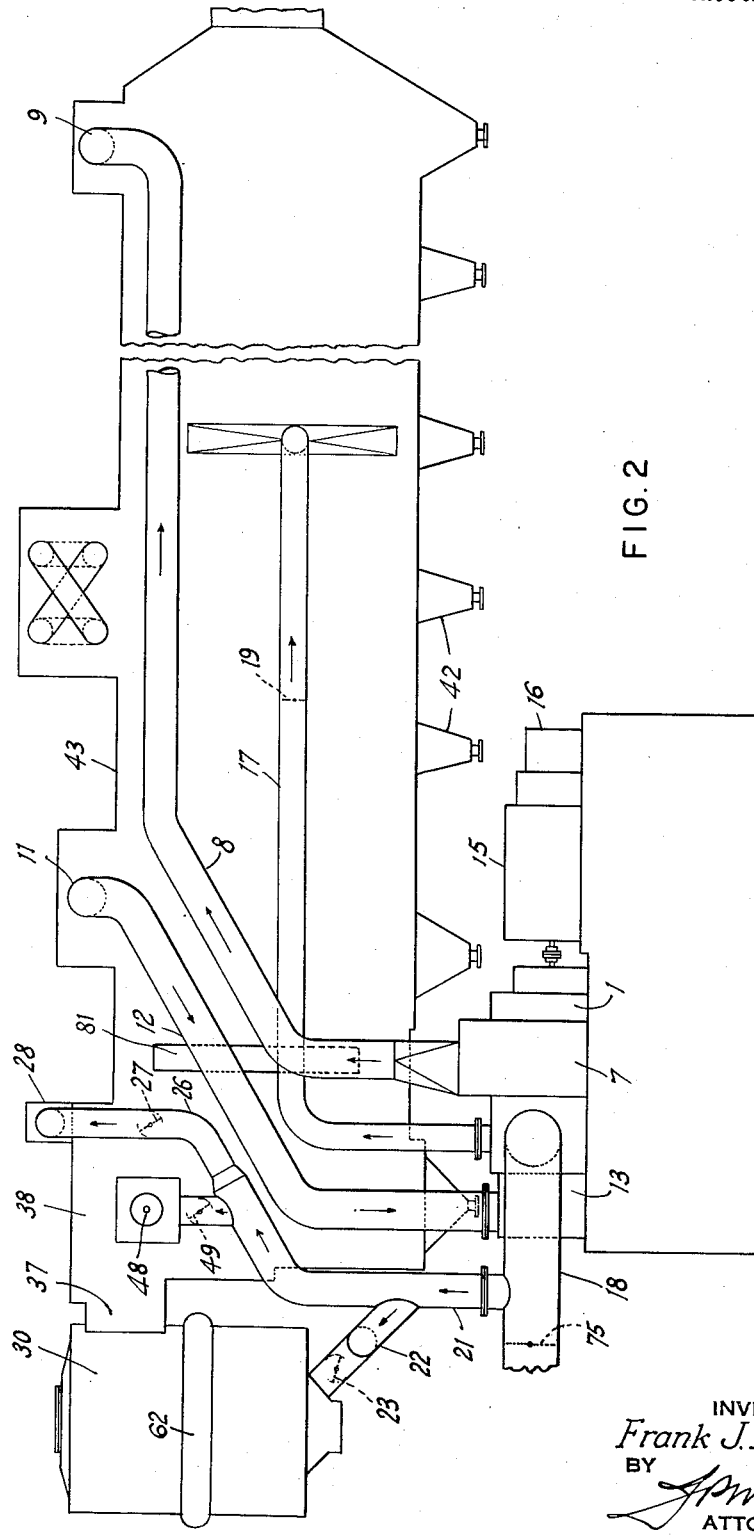
Fig. 2 is an elevation showing the layout of the main equipment and conduit connections indicated in Fig. 1.
Figure 3:
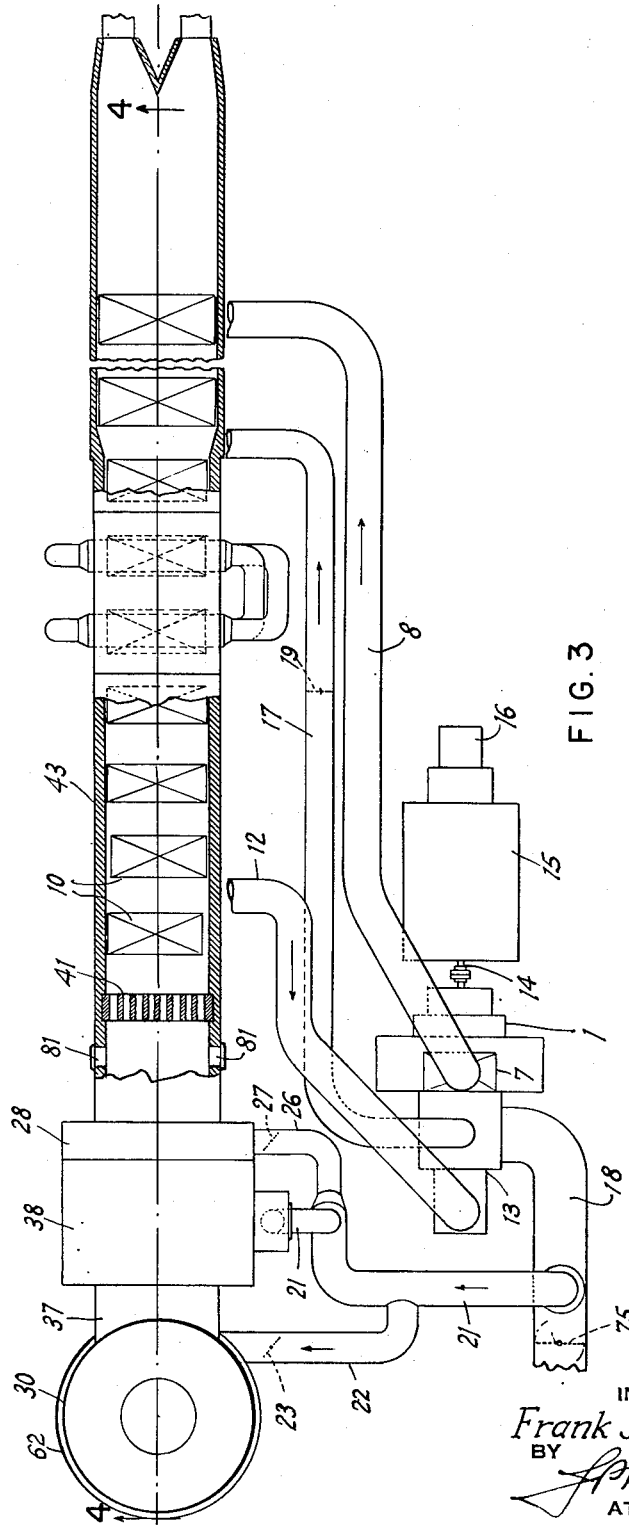
Fig. 3 is a plan view, partly broken away, of the equipment shown in Fig. 2.

As diagrammatically illustrated in Fig. 1, air flowing under pressure in a surface heat exchanger 10 is heated by the products of combustion from a furnace which has refuse of a relatively high moisture content as its primary source of fuel. Atmospheric pressure air is drawn into the first stage of a rotary compressor 1 through an air inlet 2 and subjected to compression therein and delivered at the compressor outlet 3 at a substantially higher temperature and pressure than at the inlet. The air is then directed through a surface heat exchanger or intercooler 4 and in its flow therethrough cooled with a minimum reduction in pressure by cooling water derived from a suitable cooling tower system (not shown). From the intercooler outlet 5, the air is directed to the inlet 6 of a second stage or high pressure compressor 7, from which it is conducted by a relatively short conduit 8 to the inlet header 9 of a multiple loop heat exchanger 10. The air flowing through the tubes of the heat exchanger is subjected to heat by hot gases, as hereinafter described, and is delivered to the heat exchanger outlet header 11 at a substantial pressure and at a high temperature, preferably of the order of at least 1300° F.

The outlet header 11 is connected by a relatively short circuit 12 to the high pressure end of an air turbine 13, through which the compressed and heated air is expanded to a lower exhaust pressure, with the development of power which drives the compressors 1 and 7, and an electrical generator 15 through shaft 14. A starting motor 16, receiving its electric power from another source, is also indicated as operatively connected to the shaft 14 for initiating operation of the rotating equipment and keeping it rotating until an adequate supply of heated and compressed air is available through conduit 12 to maintain it in operation. The air is exhausted from the turbine 13 at a pressure close to atmospheric pressure and at a temperature which will be of the order of 824° F.

Two conduits 17 and 18 receive the turbine exhaust air. Conduit 17 directs a flow of air subject to the operation of a control valve 19 to an intermediate point in the gas path of the heat exchanger 10, as hereinafter described, while conduit 18 conducts exhaust air to the fuel burning equipment of the plant. Governor mechanism 20 associated with the rotating shaft of the turbine operates a suitable overspeed trip mechanism to initiate a control impulse to control apparatus as hereinafter described, in case the turbine and connected rotating apparatus should overspeed to a predetermined extent due to any sudden relief from a connected electrical load on the generator 15.

Figure 4:
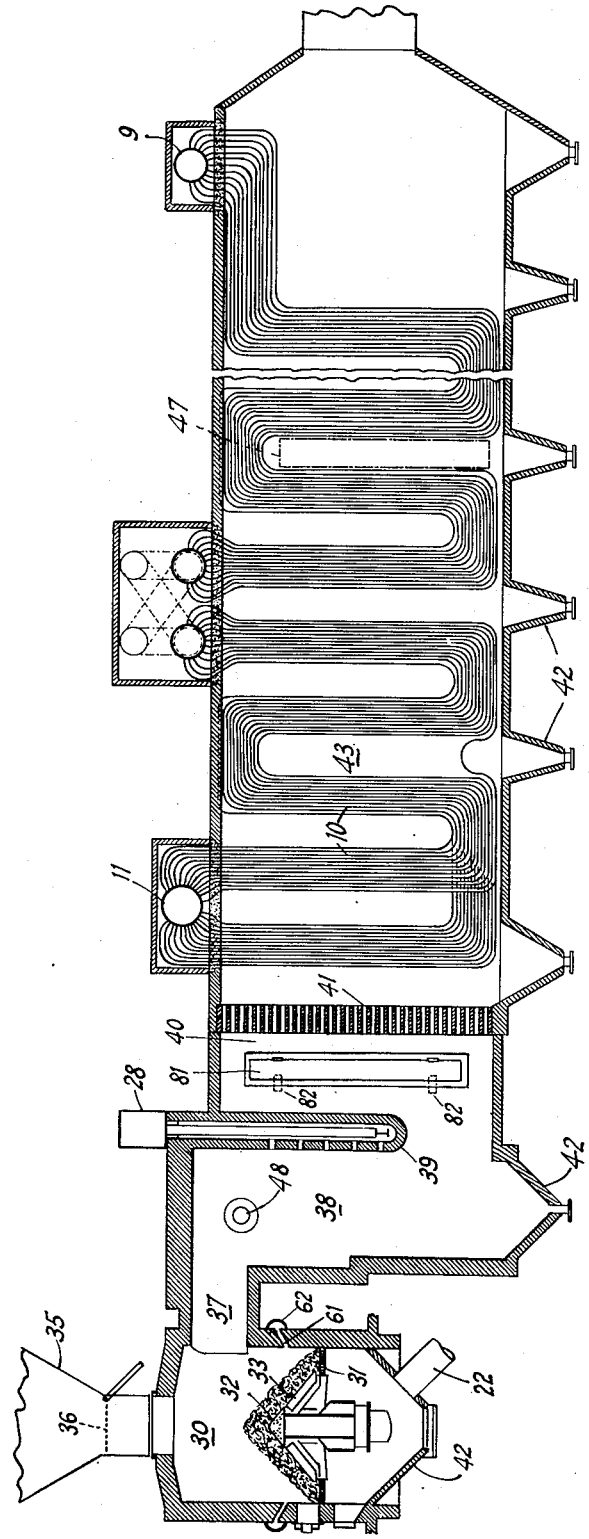
Fig. 4 is a sectional elevation, on line 4—4 of Fig. 3, of the fuel burning equipment and heat exchanger.

The fuel burning equipment illustrated in Figs. 1 and 4 comprises a refuse incinerator furnace 30, having a circular hearth 31. The central portion of the hearth is formed by a rotatable cone member 32 equipped with horizontally extending arms 33. The cone member and arms are constructed and arranged to agitate solid fuel material deposited on the center section and to gradually feed it toward the surrounding annular dumping grate area of the hearth. The cone member and arms are constructed to cause streams of air to discharge through perforations therein to promote drying and combustion of the solid refuse material on the hearth. Drying of the fuel is highly important, as such municipal refuse will have a moisture content normally varying from 15-40% and if garbage be included, may run as high as 60%. The air for the cone member and arms, as well as combustion air for the space below the annular grate section, is received from the air turbine exhaust conduit 18 and is conducted to the incinerator by conduits 21 and 22, the latter having a control damper or valve 23. Turbine exhaust air is also supplied under controlled conditions to the upper side of the fuel pile on the hearth 31 through wall ports 61 supplied by a bustle pipe 62. A conduit 63 having a control damper 64 supplies turbine exhaust air from the conduit 22 to the bustle pipe 62.

The combustible solid refuse to be burned is normally periodically charged into the upper end of the incinerator furnace 30 from a hopper 35 through a movable gate 36 and deposits on the hearth 31, as indicated in Fig. 4. The refuse is rapidly dried and burned with the high temperature air supplied from conduit 22. The gaseous products of combustion leave through the outlet 37 at the upper side of the furnace and pass into a secondary combustion chamber 38, through which the gases flow downwardly and under a hollow perforated curtain wall 39 to a heating gas outlet chamber 40. A wall of refractory checkerbrick 41 having a multiplicity of distributed gas passages therein tends to equalize the flow of heating gases over the height of a horizontally elongated chamber 43 in which the multiple loop heat exchanger 10 is located. The heating gases flow longitudinally of the chamber 43 to an induced draft fan 45, which in operation causes the gases to be drawn from the incinerator furnace 30 over the air heating tubes of the heat exchanger 10 and discharges the gases to a stack 46 from which they pass to the atmosphere. The described system from the chamber 30 to the inlet of fan 45 is maintained at subatmospheric pressure so that any obnoxious gases released therein will not contaminate the surrounding atmosphere during normal operation. Ash hoppers 42 are provided below the furnace 30, chamber 38, and at various points along the bottom of the chamber 43, through which the ashes dumped from the hearth and separating from the heating gases are removed.

A burner 48 is provided for the introduction and burning of a supplementary fluid fuel, such as gas or oil. It is arranged in an end wall of the chamber 38, and receives its supply of combustion air through conduit 21 from the exhaust of the air turbine 13 subject to control by a valve or damper 49 therein. Fuel line 50 and fuel control valve 51 are arranged to provide a fuel supply to the burner 48.

Another branch conduit 26 with a regulating and control valve or damper 27 connects the air turbine exhaust line to a transverse distribution chamber 28 supplying air to the hollow curtain wall 39. The air so supplied flows downward within the wall and out through the apertures therein facing the secondary combustion chamber 38 and acts to maintain the structural supports of the curtain wall at a safe operating temperature as well as providing secondary combustion air for the chamber 38. The air supply through the curtain wall 39 may also be used to control the temperature of the gases flowing from the outlet 37 by diluting the same with the lower temperature air. The transverse introduction of air at this point also tends to reduce stratification of the gases in the chamber 38.

It is important to avoid temperatures in the furnace 30 above the fuel ash fusion temperature to avoid fused ash running down on to the grate section. A thermostatic element 65 is arranged in the outlet 37 to automatically control the damper 64 to permit or increase the flow of air to the ports 61 to dilute the high temperature gases from the fuel bed when their temperature tends to rise above a predetermined safe value.

The turbine exhaust air flowing through conduit 18 can be divided into a plurality of separate streams which serve different but related functions. In operation damper 27 is regulated to continuously permit a flow of combustion air through conduit 26 to the hollow curtain wall 39. The remaining portion of the air flowing through conduit 18 is alternately directed into the incinerator furnace 30, or to fuel burner 48, or divided between them as desired, in order to maintain suitable combustion conditions insuring a substantially constant high temperature heating gas stream, e. g. at a temperature of the order of 1700° F., to the gas outlet chamber 40.

As the optimum air flow through the compressor-air turbine set is normally at a rate in excess of that required for combustion of fuel in either the incinerator furnace 30 or secondary furnace chamber 38, a portion of the air exhausted by the turbine is advantageously directed through the conduit 17 into the chamber 43 of the air heater 10 at an intermediate position 47 where the heating gases therein are normally at a temperature of the order of the temperature of the exhaust air at that point. This air flow through conduit 17 is regulated by the pressure responsive spillover type valve or damper 19 which automatically opens when the pressure in the exhaust conduit 17 rises above a predetermined value.

The power plant system indicated may be operated from the generation of heat solely by the supplementary fuel burner 48 in chamber 38, by the generation of heat solely by the burning of a primary fuel in the furnace, or by the simultaneous burning of a primary fuel in furnace 30 and a supplementary fuel in chamber 38. Such flexibility of operation is particularly desirable in connection with a power plant where the primary fuel is municipal refuse. In such plants, the charging of the refuse chamber 30 is normally periodic and during the charging periods, the volume of heating gases generated is interrupted. As the operation of the air turbine-generator set is desirably continuous, the provisions by which the delivery of adequately heated air is maintained irrespective of such interruptions in the operation of the incinerator furnace are particularly important.

A thermocouple or similar temperature measuring device 55 is associated with outlet chamber 40, and deviations of temperature in that chamber as sensed by that thermostat are used to initiate control of the air supply, or of the air and fuel supplies, to the end that the gas temperature in the chamber 40 will be maintained at the optimum level. Damper 23 has an operating mechanism indicated at 56 which is subject to temperature initiated impulses by thermostatic device 55. If the temperature in chamber 40 tends to be too low, a greater flow of air through conduit 22 will be permitted so as to burn the refuse in furnace 30 at a greater rate. If the temperature becomes too high, the reverse action follows. Under these operating conditions, fuel valve 51 and air flow damper 49 are at a predetermined minimum flow setting sufficient to maintain ignition. Any turbine exhaust air not used by the incinerator furnace 30, burner 48 and curtain wall 39 is relieved through conduit 17 by the automatically operating valve 19.

As the fuel burns out in the incinerator furnace and the gas temperature decreases at thermostatic device 55, a higher control pressure impulse will be developed by the latter to the extent that the supplies of fuel and air to burner 48 will be automatically increased through the operation of control valves 51 and 49 respectively, until the desired heating gas temperature is restored. When a charge of refuse in furnace 30 has burned down to a point that the furnace should be recharged, the gate 36 is opened, and gate switch 66 operates through connection 67 to disconnect the control pressure delivered from a transfer device 68 to the operating mechanism 56, causing damper 23 to close. Thus during the charging period for furnace 30, there will be no air flow into it through conduit 22. During the charging period the major portion of the heating gases will be supplied by burning of the supplementary fuel by burner 48, subject to the control of the thermostatic device 55.

After the charging has been completed and the gate 36 returned to its closed position, the gate switch 66 through its connection 67 permits the transfer device 68 to bring damper 23 back under the control of thermostatic device 55. While damper 23 may be brought quickly to a fully open condition, the depth of the charge of refuse and slowness of ignition may delay the delivery of sufficiently hot gases from the incinerator. In the meantime the burning of supplementary fuel by burner 48 will be continued, but at a progressively decreasing rate, subject to the control of the thermostatic device 55. As the temperature of gases from furnace 30 is increased, burner 48 will upon full temperature delivery from furnace 30 be cut back to a minimum or pilot flame rate. The described cycle of burning out the refuse charge and recharging during supplementary fuel operation will then be repeated, subject to whatever manual variation as may be desirable. There will also be periods when the supply of combustible refuse for furnace 30 will not be available, and the arrangement of apparatus is such that continued operation of the plant on an efficient basis can be maintained by burning the supplementary fuel solely in chamber 38.

Emergency protection of the air heating tubes is provided through suitable control apparatus deriving its initial impulse from the speed governor mechanism 20 of the turbine 13. As the rate of heat developed by the incinerator furnace 30 is a function of the introduction of combustion air thereto through conduit 22 and damper 23, while the stream of air through the tubes 10 is due to the continued operation of the compressors 1 and 7, the heat generation must be decreased quickly upon any stoppage of the air flow through the heat exchanger 10 if the tubes therein are to be kept from overheating. When the air turbine overspeeds due to the loss of connected generated load, provision is made for a conventional overspeed trip operated by the governor 20 through a line 70 indicated in dot and dash lines to cut off the control pressure on damper 23, so that it will close and stop any further delivery of air to furnace 30. Corresponding extension lines 72, 73, cause similar impulses to render valves 49 and 51 controlling the air and fuel supplies respectively to burner 48 to be ineffectual for any increase in heat input, so that no appreciable high temperature heating gas flow will pass over the tubes of the heat exchanger 10 after the overspeed trip functions.

As exhaust air from turbine 13 will continue to be delivered even though the overspeed trip has functioned, and as the conduit connection 17 may not be adequate to handle the entire quantity, a vent valve 75 is connected to the conduit 18. The valve 75 is automatically controlled through the line 74, indicated by the dash-dot line, so that it will open upon functioning of the overspeed trip and discharge a portion of the exhaust air to the atmosphere.

A pair of vertically elongated doors 81 are arranged at opposite sides of the outlet chamber 40 and held in a closed position by solenoid controlled spring locks 82. In the event the turbine trips out and the air flow through the air heater tubes 10 substantially decreases or stops, overheating of these tubes is further avoided by automatic actuation of the solenoids by the overspeed trip, as diagrammatically indicated in Fig. 1, to release the spring locks 82 and allow the doors to open. A flow of atmospheric air will be then induced through the open doors into the chamber 40 where the incoming air mixes with and substantially lowers the temperature of the heating gases flowing therethrough, thereby preventing the air heater tubes from being overheated.

While in accordance with the provisions of the statutes I have illustrated and described herein the best form of the invention known to me, those skilled in the art will understand that changes may be made in the apparatus and method disclosed without departing from the spirit of the invention covered by my claims, and that certain features of my invention may sometimes be used to advantage without a corresponding use of other features.

I claim:

1. In a power plant, a furnace having means for burning solid fuel therein, means for intermittently charging a high moisture content solid fuel to said furnace, a secondary combustion chamber in series with and arranged to receive all of the heating gases from said furnace, means for burning a supplementary fluid fuel in said secondary combustion chamber, a tubular air heater in series with and arranged to receive heating gases from said secondary combustion chamber, an air compressor arranged to supply compressed air to said air heater, an air turbine arranged to receive high temperature compressed air from said air heater, and means for utilizing the high temperature exhaust air from said air turbine comprising conduits connecting said turbine to said furnace and secondary combustion chamber, and means for controlling the supply of exhaust air to said secondary combustion chamber in response to variations in the temperature of the heating gases entering said air heater.

2. In a power plant, a furnace having means for burning solid fuel therein, a secondary combustion chamber in series with and arranged to receive all of the heating gases from said furnace, means for burning a supplementary fluid fuel in said secondary combustion chamber, a tubular air heater in series with and arranged to receive heating gases from said secondary combustion chamber, an air compressor arranged to supply compressed air to said air heater, an air turbine arranged to receive high temperature compressed air from said air heater, and means for utilizing the high temperature exhaust air from said air turbine comprising conduits connecting said turbine to said furnace and secondary combustion chamber, means for independently regulating the supply of exhaust air through each of said conduits, and means for rendering said regulating means ineffective on a predetermined increase in the speed of said air turbine.

3. In a power plant, a furnace having means for burning solid fuel therein, means for intermittently charging a high moisture content solid fuel to said furnace, a secondary combustion chamber in series with and arranged to receive all of the heating gases from said furnace, means for burning a supplementary fluid fuel in said secondary combustion chamber, a tubular air heater in series with and arranged to receive heating gases from said secondary combustion chamber, an air compressor arranged to supply compressed air to said air heater, an air turbine arranged to receive high temperature compressed air from said air heater, means for utilizing the high temperature exhaust air from said air turbine comprising conduits connecting said turbine to said furnace and secondary combustion chamber, means for controlling the supply of fluid fuel and exhaust air to said secondary combustion chamber in response to variations in the temperature of the heating gases entering said air heater, a conduit for delivering surplus exhaust air from said turbine to an intermediate point in the heating gas flow path through said air heater in mixing relation with said heating gases, and exhaust air pressure responsive means for controlling the air flow through said last named conduit.

4. The method of generating power from the burning of solid fuel in an intermittently charged furnace which comprises intermittently charging the furnace with solid fuel, supplying high temperature air for burning the solid fuel, conducting the heating gases generated successively through a secondary combustion chamber and an air heater, continuously supplying compressed air to be preheated to said air heater, expanding the preheated compressed air through an air turbine, supplying the turbine exhaust air to said furnace and secondary combustion chamber, and burning a supplementary fluid fuel in said secondary combustion chamber at a rate which is responsive to a variation in the temperature of the heating gases entering said air heater from a predetermined value.

5. The method of generating power from the burning of high moisture solid fuel in an intermittently charged furnace which comprises intermittently charging the furnace with high moisture solid fuel, supplying high temperature air for drying and burning the solid fuel, conducting the heating gases generated successively through a secondary combustion chamber and an air heater, continuously supplying compressed air to be preheated to said air heater, expanding the preheated compressed air through an air turbine, supplying high temperature turbine exhaust air to said furnace and secondary combustion chamber, burning a supplementary fluid fuel in said secondary combustion chamber at a rate which is responsive to a variation in the temperature of the heating gases entering said air heater from a predetermined value, and introducing any surplus exhaust air into the heating gas flow path through said air heater at a point where the heating gas and exhaust air temperatures are approximately the same.

6. The method of generating power from the burning of high moisture solid fuel in an intermittently charged furnace which comprises intermittently charging the furnace with high moisture solid fuel, supplying high temperature air for drying and burning the solid fuel, withdrawing the heating gases generated successively through a secondary combustion chamber and an air heater, continuously supplying compressed air to be preheated to said air heater, expanding the preheated compressed air through an air turbine, supplying high temperature turbine exhaust air to said furnace and secondary combustion chamber, burning a supplementary fluid fuel in said secondary combustion chamber at a rate which is responsive to a variation in the temperature of the heating gases entering said air heater from a predetermined value, and regulating the supply of turbine exhaust air to said furnace and secondary combustion chamber on a predetermined increase in speed of the air turbine.

7. The method of generating power from the burning of high moisture solid fuel in an intermittently charged furnace which comprises intermittently charging the furnace with high moisture solid fuel, supplying high temperature air for drying and burning the solid fuel in said furnace, withdrawing the heating gases generated successively through a secondary combustion chamber and an air heater, continuously supplying compressed air to be preheated to said air heater, expanding the preheated compressed air through an air turbine, supplying the turbine exhaust air to said furnace and secondary combustion chamber, burning a supplementary fluid fuel in said secondary combustion chamber at a rate which is responsive to a variation in the temperature of the heating gases entering said air heater from a predetermined value, and regulating the temperature in said furnace by the introduction of exhaust air above the charge of burning fuel therein at a rate which is responsive to a predetermined increase in the temperature of the heating gases leaving said furnace above a predetermined value.

References Cited in the file of this patent

UNITED STATES PATENTS

| Number | Name | Date |
| --- | --- | --- |
| 583,566 | Colwell | June 1, 1897 |
| 990,688 | Walker | Apr. 25, 1911 |
| 2,268,074 | Keller | Dec. 30, 1941 |
| 2,298,625 | Larrecq | Oct. 13, 1942 |
| 2,394,253 | Nettel et al. | Feb. 5, 1946 |
| 2,420,335 | Nettel et al. | May 13, 1947 |
| 2,434,950 | Nettel et al. | Jan. 27, 1948 |
| 2,453,938 | Schmidt | Nov. 16, 1948 |
| 2,454,358 | Traupel | Nov. 23, 1948 |
| 2,472,846 | Nettel et al. | June 14, 1949 |
| 2,478,504 | Ruegg | Aug. 9, 1949 |
| 2,486,291 | Karrer | Oct. 25, 1949 |
| 2,540,598 | Ruiz | Feb. 6, 1951 |

FOREIGN PATENTS

| Number | Country | Date |
| --- | --- | --- |
| 546,275 | Great Britain | July 6, 1942 |